United States Patent [19]

Willis

[11] 4,005,269

[45] Jan. 25, 1977

[54] APPARATUS FOR INTERFACING BETWEEN TELEPHONE AND WIRELESS COMMUNICATION SYSTEMS

[75] Inventor: Hilda Willis, Los Altos, Calif.

[73] Assignee: Harry H. Hicks, Jr., San Mateo, Calif.

[22] Filed: Jan. 6, 1975

[21] Appl. No.: 538,796

[52] U.S. Cl. .............................................. 179/2 C
[51] Int. Cl.² ...................................... H04M 11/00
[58] Field of Search ............ 179/1 C, 2 B, 2 C, 2 E

[56] References Cited

UNITED STATES PATENTS

| | | | |
|---|---|---|---|
| 3,100,818 | 8/1963 | Carter | 179/1 C |
| 3,557,312 | 1/1971 | Vogelman et al. | 179/2 E |

Primary Examiner—Kathleen H. Claffy
Assistant Examiner—E. S. Kemeny
Attorney, Agent, or Firm—Phillips, Moore, Weissenberger, Lempio & Strabala

[57] ABSTRACT

An apparatus for interfacing between a telephone instrument and a wireless communication system is disclosed. Subsystems of the apparatus include: telephone answering; telephone handset acoustic coupling (called "audio transducer"); transceiver acoustic coupling (called "audio mixing"), and a voice-loop circuit which isolates incoming and outgoing communication signals.

Features of the invention include the use of the second (transceiver) acoustic coupling subsystem which allows, among other functions, any microphone (supplied with the transceiver) to be acoustic impedance-matched to the apparatus.

8 Claims, 4 Drawing Figures

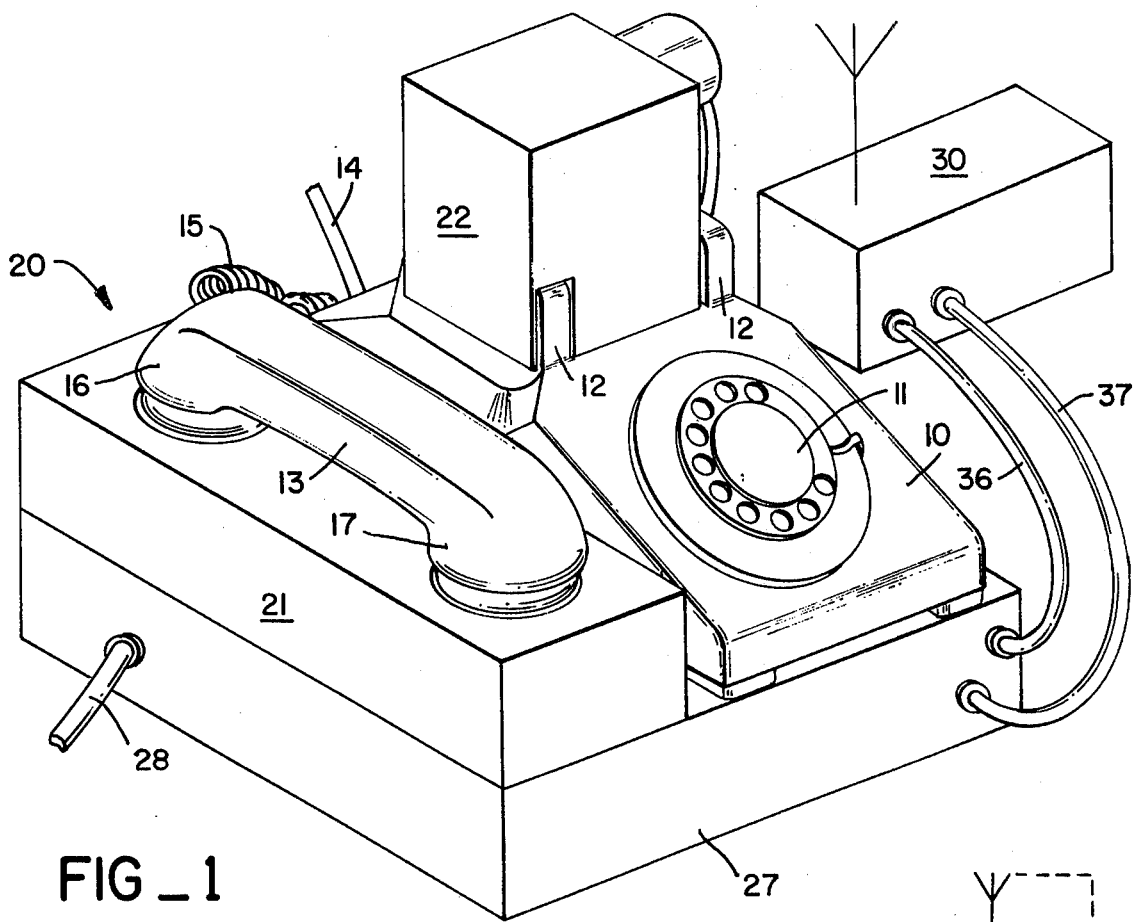
FIG_1
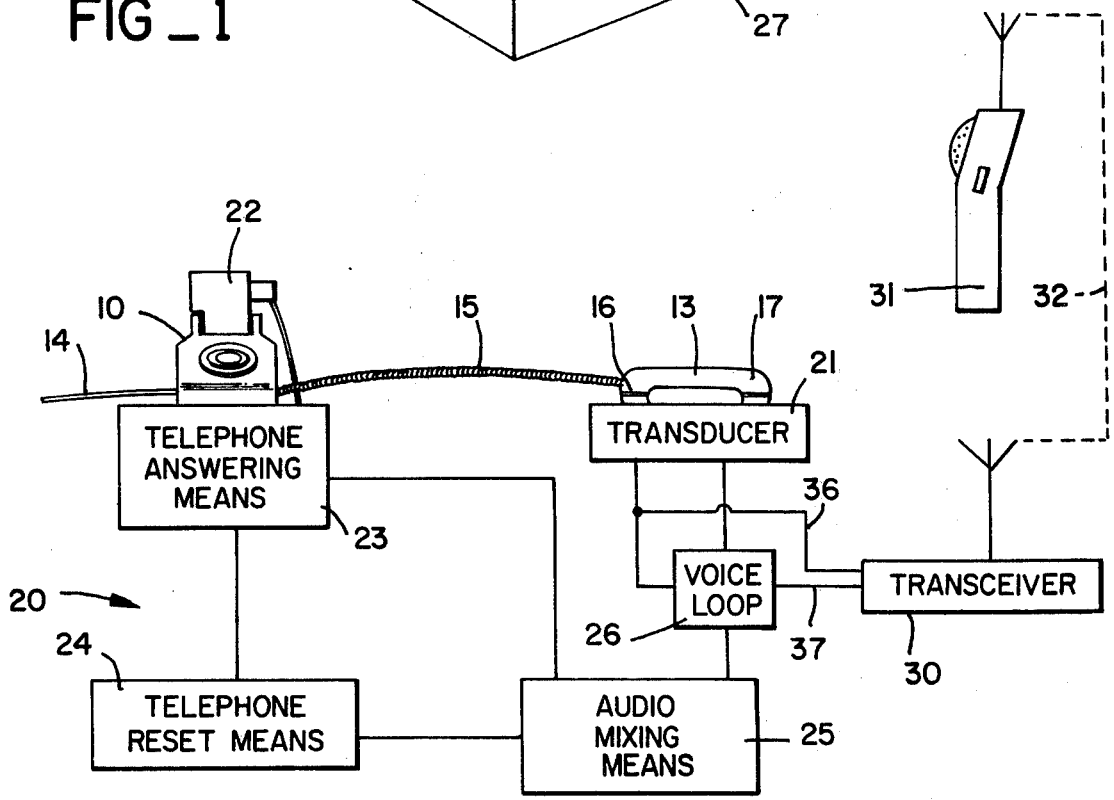
FIG_2

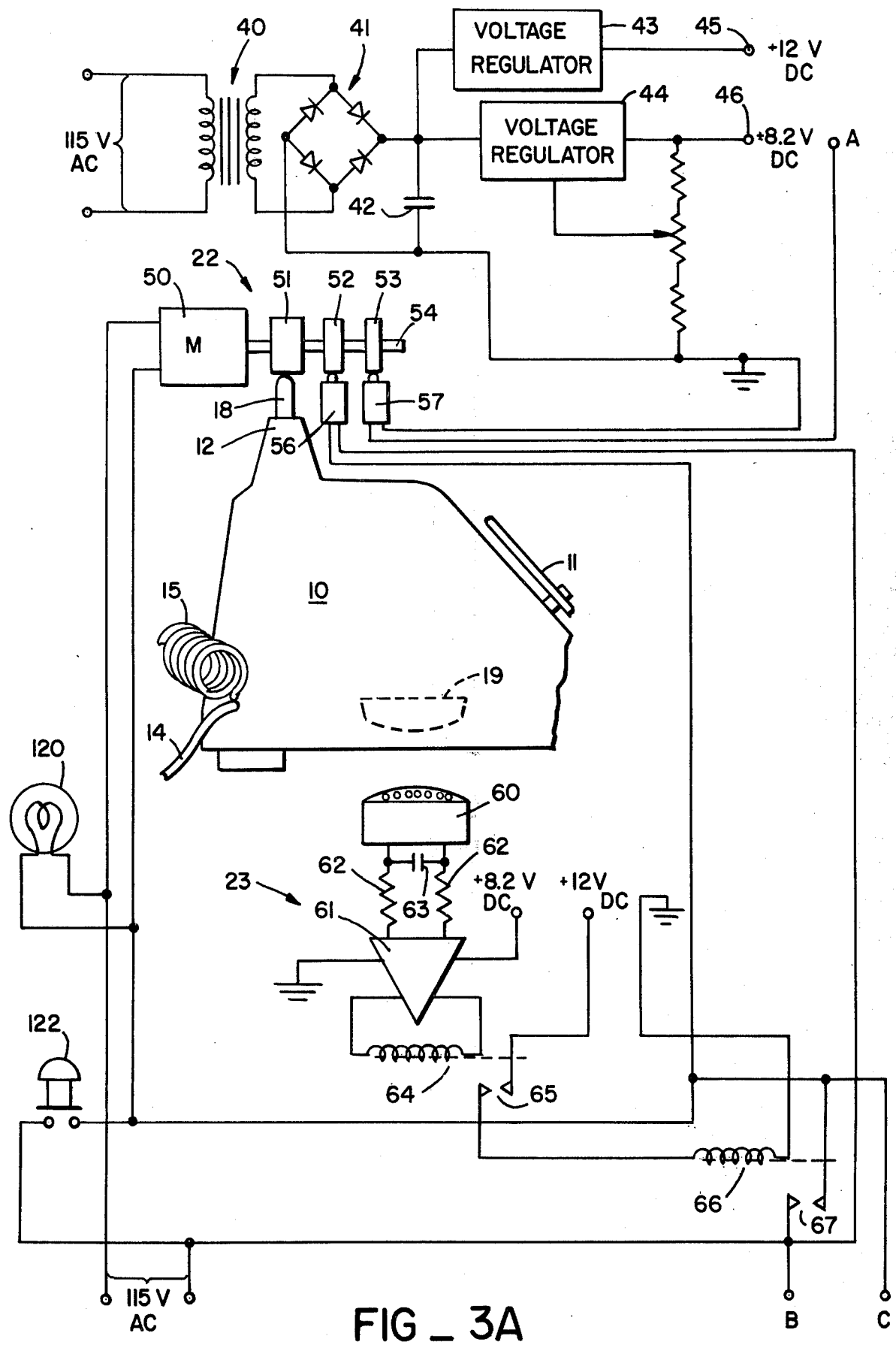
FIG_3A

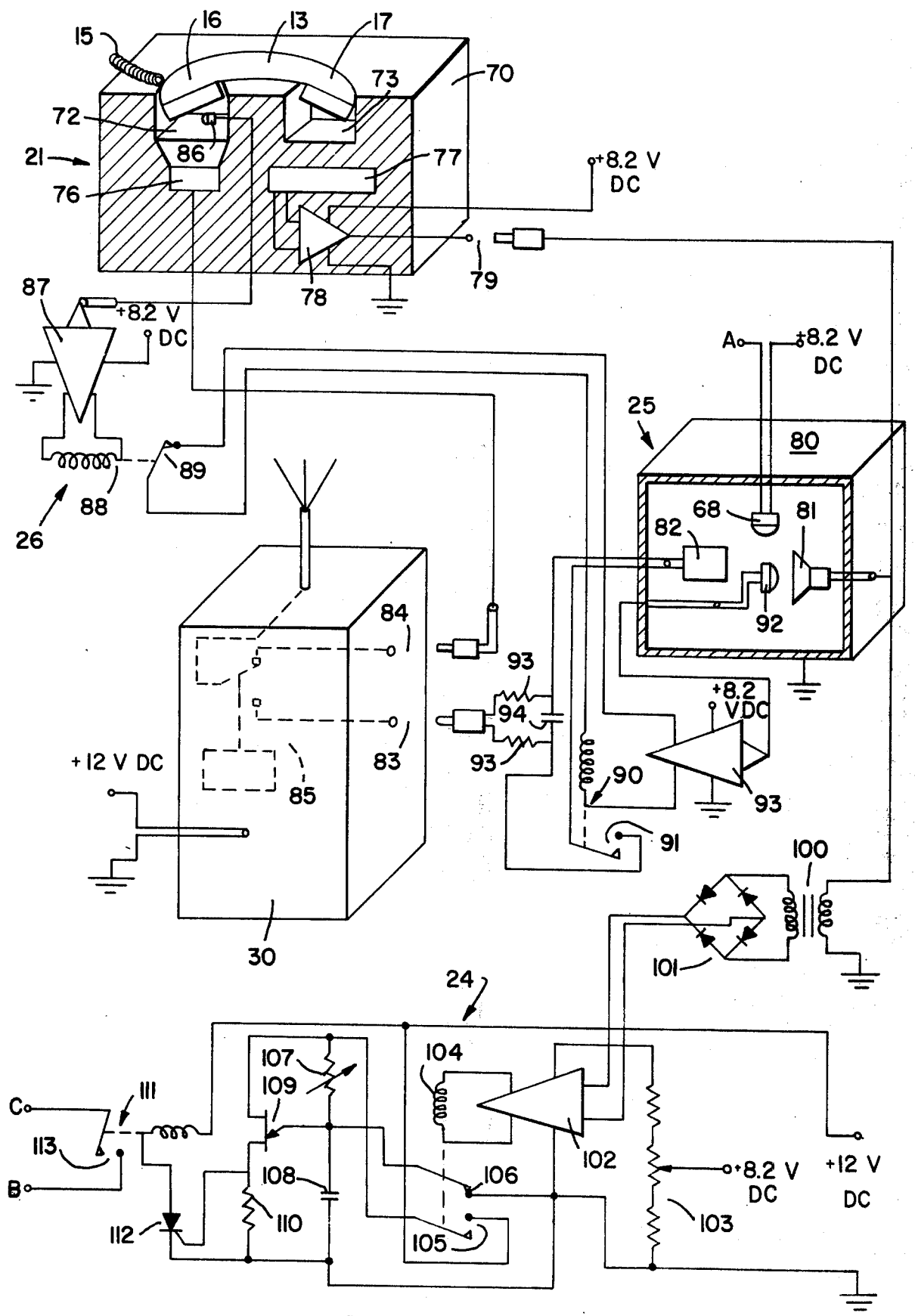
FIG _ 3B

APPARATUS FOR INTERFACING BETWEEN TELEPHONE AND WIRELESS COMMUNICATION SYSTEMS

BACKGROUND OF THE INVENTION

This invention relates to systems for coupling a point remote from a particular telephone instrument of a telephone network to such telephone instrument and more particularly to an interface for coupling a particular telephone instrument to a wireless voice operated transceiver with no direct electrical connection between the interface and the telephone instrument and no modification of the wireless voice operated transceiver.

A wide variety of systems for coupling a remote point to a telephone network by means of a wireless radio link have been proposed. Such systems have either required a specially built or wired telephone instrument to enable direct electrical connections to the telephone network in conformity with telephone company regulations or a specially constructed wireless communication system, or both, particularly where the system is designed to operate without human intervention at the telephone instrument.

It is an object of this invention to provide a method of and means for interfacing between a telephone instrument and a conventional wireless communication system to enable coupling of the telephone instrument to a remote point without human intervention at the telephone instrument and without direct electrical connection to the telephone instrument or use of a specially constructed wireless communication system.

In the prior art, elaborate wireless communication systems were proposed involving special transmitters and receivers as well as special oscillator circuits and solenoids which not only separated the incoming and outgoing signals of the wireless system but also enabled the control of the telephone instrument from the remote point. Such wireless systems had to be specially fabricated and were thus too expensive for use in many applications particularly where all that is desired is the coupling of an incoming call on the telephone instrument to a remote point.

It is a further object of this invention to provide a method of and means for interfacing between a telephone instrument and any commercially available wireless communication system including wireless transceivers at least one of which is voice actuated.

Although simplification of the prior art systems to eliminate control of the telephone from the remote point has been proposed heretofore, none of the prior art systems have made adequate allowance for the fact that the mouthpiece and earpiece of the telephone instrument are electrically connected in such a way that a person speaking into the mouthpiece will hear his own voice in the earpiece of the instrument. Thus, if the telephone instrument is coupled to a conventional wireless transceiver system, which would necessarily require that the transceiver located at the telephone handset be voice actuated in order to provide automatic operation, it will be seen that a signal from the remote point applied to the mouthpiece of the telephone instrument will also generate a corresponding signal at the earpiece of the instrument tending to actuate the transmitting mode of the wireless transceiver located at the instrument thereby interfering with the desired operation of the wireless communication system.

Thus, it is another object of this invention to provide a method of and means for interfacing between a telephone instrument and a conventional wireless communication system including a voice actuated transceiver at the telephone instrument which will avoid interference between the incoming and outgoing signals of the voice actuated transceiver.

Furthermore, the prior art has required complicated circuitry for disconnecting the telephone instrument from the telephone network upon termination of a particular conversation over the system. Such circuits have either required some sort of control originating at the remote point or have included complicated circuitry for detecting the cessation of the conversation and thereafter disconnecting the telephone instrument from the telephone network. It will be understood that the provision of control at the remote point would require modification of commercial wireless communication systems. It will also be understood that circuitry for detecting cessation of actual conversation is subject to inaccurate operation due to noise in the communication system or unexpected delays in the conversation.

It is a still further object of this invention to provide a method of and means for interfacing between a telephone instrument and a wireless communication system in which the telephone instrument is disconnected from the telephone network in response to a signal generated by the telephone instrument itself in normal operation.

A particular object of the invention is to provide means which allows any microphone (supplied with a transceiver) to be efficiently coupled (i.e. acoustic impedance matched) to the apparatus and further this means may include a plurality of microphones and speakers for additional speech or signalling control functions, whereby this means is to be called "audio mixing means", in contradistinction to the "audio transducer means" which comprises the telephone handset coupler itself which uses a specific microphone-speaker set acoustically coupled to the telephone handset.

SUMMARY OF THE INVENTION

Briefly the apparatus of this invention provides an acoustic interface between a telephone instrument of a conventional telephone network and a conventional wireless communication system having at least one voice actuated transceiver whereby electrical impedance matching problems are avoided to enable interfacing between a plurality of different conventional wireless communication systems and a conventional telephone network. Thus, the apparatus of this invention comprises an audio circuit including an audio mixing means in the form of a hollow acoustic chamber with a speaker mounted therein for acoustically reproducing audio signals present at the earpiece of the telephone instrument. A microphone coupled to the input of the transceiver is also mounted in the hollow acoustic chamber. The apparatus according to this invention includes electromechanical control means removably mounted on the cradle of the telephone instrument for simulating the removal and return of the handset of the telephone instrument to the cradle thereof and audio transducer means receiving the mouthpiece and earpiece of the handset of the telephone instrument. The audio transducer means is adapted to acoustically insulate the mouthpiece and earpiece of the telephone instrument handpiece from each other and includes speaker means for applying an acoustic signal to the mouthpiece of the handset, means for transmitting an audio signal received from the earpiece of the handset to the speaker in the hollow acoustic chamber and audio sensor means for detecting the application of an acoustic signal to the mouthpiece of the handset. The audio sensor means for detecting the application of an acoustic signal to the mouthpiece of the handset includes means for interrupting the audio circuit between the earpiece of the telephone handset and the input of the voice operated transceiver. Answering means for sensing the ring of the telephone instrument and actuating the control means to simulate removal of the handset of the telephone are included in the interface means together with reset means for sensing the presence of the dial tone of the telephone network of which the telephone instrument is a part, at the earpiece of the telephone instrument and actuating the control means to simulate the replacement of such handset on the cradle thereof.

BRIEF DESCRIPTION OF THE DRAWING

The foregoing and other objects and features of advantage of the subject invention will be more fully understood from a reading of the following detailed description of a preferred embodiment thereof in conjunction with the attached drawing wherein:

FIG. 1 is a perspective view of a preferred embodiment of the means for practicing the teaching of this invention with a telephone instrument shown in operative relation thereto;

FIG. 2 is a functional block diagram illustrating the method and means of this invention; and FIGS. 3A and 3B together provide a wiring diagram of the embodiment of the means of this invention shown in FIG. 1 with certain electrical and mechanical elements thereof illustrated schematically and others in block form.

DETAILED DESCRIPTION OF PREFERRED EMBODIMENT

Referring to FIG. 1, an embodiment of the means according to the teaching of this invention is shown in operative relation to a conventional telephone instrument of the type comprising a main body portion 10 which includes the dialing mechanism 11 and a rigid cradle portion 12 for receiving the handpiece 13 thereof. The body 10 of the telephone instrument is connected to the telephone network by means of an appropriate electrical telephone cord 14 and the handset 13 is connected to the body 10 by means of electrical cord 15.

As shown in FIGS. 1 and 2, the apparatus 20 of this embodiment of the interface means according to the teaching of this invention comprises an audio transducer means 21 for receiving the handpiece 13 of the telephone instrument and for acoustically isolating the mouthpiece 16 of the handset 13 from the earpiece 17 thereof. The apparatus 20 also includes an electromechanical device for simulating the removal and replacement of the handpiece 13 on the cradle 12 of the body 10 of the telephone instrument.

In operation, as shown in FIG. 1, the handpiece 13 is removed from the cradle 12 and placed in operative relation to the audio transducer means 21 and the device 22 is placed on the cradle 12 of the body 10 of the telephone instrument in replacement of the handset 13. As best shown in FIG. 2, the interface means also includes appropriate circuitry 23 for activating the device 22 to simulate the removal of the handpiece 13 from the cradle 12 as well as appropriate circuitry 24 to activate the device to simulate the return of handset 13 to the cradle 12 and thereby reset the telephone instrument for further incoming calls. In addition, the interface means according to this invention includes an audio mixing means 25 and a voice loop correction means 26 which will be more fully described hereinafter. In the apparatus shown in FIG. 1, the circuitry 23 and 24 and the means 25 and 26, together with an appropriate power supply, are all included within the base structure 27 which is adapted to support the body 10 of the telephone instrument. The power supply (not shown in FIG. 2) is connected to an appropriate source of power such as the conventional 115 Volt household line by means of an appropriate power cord 28, as shown in FIG. 1. Finally, the apparatus 20 is connected to a conventional voice-actuated radio frequency transceiver 30, which may be of any commercially available type having audio input and output jacks, by means of cables 36 and 37.

As best shown in FIG. 2, the transceiver 30 is coupled to a remote radio frequency transceiver 31 by means of a radio frequency link 32. The remote radio frequency transceiver 31 may be of any conventional commercially available type. Although the transceiver 30 connected to the interface apparatus 20 must be of the voice-actuated type in order to enable fully automatic operation of the interface 20, the remote transceiver 31 may be of the "push-to-talk" type adapted to operate on the same radio frequency as the transceiver 30.

In operation, the ringing of the telephone instrument due to an incoming call on the line 14 will be sensed by the telephone answering means 23 which will simultaneously activate the device 22 and send an audio signal to the audio mixing means 25. The audio signal sent to the audio mixing means 25 may be an audio tone or buzz which will be transmitted by the transceiver 30 to the remote transceiver 31 in order to alert the user that an incoming call has been received. After a given delay, the device 22 will simulate the removal of the receiver 13 from the cradle 12 of the body 10 of the telephone instrument thereby connecting the handpiece 13 to the line 14. At this point, it should be noted that the mouthpiece and the earpiece of the telephone handpiece are connected in parallel with each other so that when the user speaks into the mouthpiece 16 of the handpiece 13, he will hear his own voice in the earpiece 17. Thus, when the user of the remote transceiver 31 speaks into the transceiver to answer the incoming call, his voice will be transmitted over the radio link 32 to the transceiver 30 and applied by means of the output line 36 both to the audio transducer 21 for coupling to the mouthpiece 16 of the handpiece 13 and to the voice loop correction means 26. According to the teaching of this invention, the function of the voice loop correction circuit 26 is to decouple the portion of the audio transducer 21 corresponding to the earpiece 17 of the handpiece 13 from the input line 37 to the transceiver 30. It will be understood that but for the voice loop correction means 26 the voice of the user of the remote transceiver 31 in answering the call which is reproduced by the earpiece 17 of the handpiece 13 would activate the transceiver 30 in its transmitting mode thereby tending to cut off the incoming signal from the remote transceiver 31. As soon as audio signals from the remote transceiver 31 cease, the voice loop correction circuit 26 will reestablish coupling between the transducer 21 and the input line 37 to the transceiver 30 to thereby enable audio signals coming in to the telephone instrument over the line 14 to be transmitted by the transceiver 30 to the remote transceiver 31 over the radio link 32.

When a particular telephone call has been completed and the calling party has hung up to disconnect his telephone instrument from the telephone network, an audio signal generated by the telephone network will appear on the line 14 producing a dial tone at the earpiece 17 of the landpiece 13. According to this invention, such dial tone will be sensed by the telephone reset means 24 which will activate the electromechanical device 22 to simulate the return of the handpiece 13 to the cradle 12 of the body 10 of the telephone instrument to thereby ready the telephone instrument for further incoming calls.

From the above it will be understood that there is no direct electrical connection between the interface apparatus 20 according to the teaching of this invention and the telephone instrument. It will also be understood that the interface apparatus according to the teaching of this invention is adapted to be coupled to any conventional commercially available voice-actuated transceiver 30 having input and output jacks without internal modification of such transceiver 30.

For the purpose of this application, the term "audio signal" is used in a broad sense to mean either an acoustic signal in air or an electrical signal at audio frequencies. It will be understood that in many instances the audio signal could either be detected electrically as by means of inductance coils, etc. or electromechanically as by means of a microphone.

Referring now to FIGS. 3A and 3B, the specific circuitry of a preferred embodiment of the interface apparatus according to the teaching of this invention, is shown. The power supply for the apparatus is shown at the top of FIG. 3A as comprising a power transformer 40 having its primary winding connected across a 115 volt input line. The secondary winding of the transformer 40 is connected across a full-wave rectifier bridge 41 comprising four diodes connected in the usual configuration in parallel with an output capacitor 42.

The output of the full-wave rectifier 41, 42 is connected to a first voltage regulator 43 to provide a positive 12 volt DC output at a first terminal 45 and to a second voltage regulator 44 to provide a positive 8.2 volts DC output at terminal 46. Terminals 45 and 46 are connected to the power inputs of the various circuits of the apparatus as indicated in the drawing.

A fragmentary showing of the body 10 of the telephone instrument is shown at the center of FIG. 3A with the electromechanical device 22 for simulating the removal and replacement of the handpiece 13 on the cradle portion 12 of the body 10 shown schematically in operative relation to such cradle portion 12 of the body 10. According to this embodiment of the invention, the electromechanical device 22 comprises an electrical motor 50 with three cams 51, 52 and 53 mounted on and spaced from each other along the shaft 54 of the motor 50. The first cam member 51 is adapted to engage the button 18 included in the cradle portion 12 of the body 10 of conventional telephone instruments for the purpose of disconnecting the telephone instrument from the telephone network when the handpiece 13 is received by such cradle portion 12 and connecting the telephone instrument to the telephone network when the handpiece 13 is removed from such cradle portion 12. In other words the weight of the handpiece depresses the button 18 when it is received on the cradle portion 12 and releases such button 18 when it it removed. Thus, the motor 50 is supported on the cradle portion 12 of the body 10 and the cam member 51 is adapted to depress the button 18 during a portion of its rotation by the shaft 54 of the motor 50 and release the button 18 during the remainder of the rotation thereof. For the purpose of the following discussion the apparatus will be considered to be in its normal condition when the cam member 51 has been rotated into a position in which the button 18 is depressed to disconnect the telephone instrument from the telephone network.

A first microswitch 56 is mechanically associated with the second cam member 52 of the device 22 and a second microswitch 57 is mechanically associated with the third cam member 53 of the device 22. The mechanical relationship between the second cam member 52 and the microswitch 56 is such that the microswitch 56 is electrically open when the apparatus is in its normal condition but is immediately closed upon rotation of the cam member 52 and is held closed by the cam member 52 during a substantial portion of one rotation thereof after which the cam member 52 again allows the microswitch 56 to open. Similarly the mechanical relationship between the third cam member 53 and the microswitch 57 is such that the microswitch 57 is electrically open when the apparatus is in its normal condition however, the microswitch 57 is only closed by the cam member 53 after it has completed a substantial part of a rotation thereof.

The relationship between the cam members 51, 52 and 53 and their functions will be more easily understood from the following description of the telephone answering means in operation. The telephone answering means 23 includes a sensor 60 for detecting the audio signal produced by the ringing of the bell 19 of the telephone instrument 10 when a call is received thereby. As shown in FIG. 3A, the sensor 60 is a microphone located in close proximity to the bell 19 to detect the acoustic signal produced by the ringing of such bell. However, the sensor 60 could also be an inductive device adapted and positioned to detect the electrical signal associated with the ringing of the bell 19.

As shown in FIG. 3A the microphone sensor 60 is connected to the input of an operational amplifier 61 through input resistors 62 and input capacitor 63. The operational amplifier 61 is powered by the 8.2 volt DC output of the voltage regulator 44 and drives the solenoid of a first relay 64. The normally open contacts 65 of the relay 64 are connected in series with the solenoid of a second relay 66 across the 12 volt DC output of the voltage regulator 43. The normally open contacts 67 of the second relay 66 are connected in series with the motor 50 across the 115 volt AC input to the apparatus.

Thus, the ringing of the bell 19 of the telephone instrument 10 will be detected by the sensor 60 and will energize the solenoid of the relay 64 through the amplifier 61 thus closing the contacts 65. The closure of the contacts 65 will energize the solenoid of the second relay 66 closing the normally open contacts 67 thereof to energize the motor 50.

The motor 50 preferably includes appropriate speed reduction gearing to the shaft 54 to produce a relatively slow rotation of such shaft. Thus upon energization of the motor 50 the cam members 51, 52 and 53 are slowly rotated out of their normal position by the shaft 54 so that the cam member 51 tends to release the button 18 of the telephone instrument 10 and the cam member 52 tends to close the open contacts of the microswitch 56. It will be seen that the microswitch 56 is connected in parallel with the contacts 67 of the relay 66. Thus, the working surface of the cam member 52 may be designed to maintain the energization of the motor 50 even though the contacts 67 of the relay 66 will return to their open position when the contacts 65 of the relay 64 return to their open position when the ringing of the bell 19 of the telephone instrument ceases. The motor 50 will therefore continue to rotate the shaft 54 until the button 18 of the telephone instrument 10 has been fully released by the cam member 51. At this point the active surface of the cam member 52 is designed to allow the microswitch 56 to return to its open condition deenergizing the motor 50. It will be understood that the ringing of the bell 19 will cease when the button 18 of the telephone instrument has been fully released to connect the telephone instrument 10 to the telephone network.

According to the embodiment of the invention shown in FIGS. 3A and 3B, the microswitch 57 associated with cam member 53 is connected in series with an appropriate sound source 68 such as a bell or buzzer physically associated with the audio mixing means 25 (see FIG. 3B) across the 8.2 volt DC output of the voltage regulator 44. For clarity of illustration, the connection of the microswitch 57 to a sound source 58 is indicated by the terminals labeled A in FIGS. 3A and 3B and the connection of the sound source 68 to the voltage regulator 44 is indicated by the terminal labeled 8.2 volts DC in FIG. 3B. The working surface of the cam member 53 is designed to close the contacts of the microswitch 57 to energize the sound source 68 upon rotation of the cam member 53 by the shaft 54. Thus, upon energization of the motor 50 in response to the ringing of the bell 19 of the telephone instrument 10 the sound source 68 will be energized to produce an audio signal which is coupled from the audio mixing means 25 to the voice actuated transceiver 30, as will be more fully described hereinafter for transmission by the voice operated transceiver 30 to the remote transceiver 31 over the radio link 32 (see FIG. 2).

The purpose of the audio signal generated by the sound source 68 and transmitted to the remote transceiver 31 is, of course, to alert the user to the fact that a call has been received by the telephone instrument 10 which call is in the process of being answered by the operation of the telephone answering means 23 and the device 22. In a preferred embodiment of this invention as illustrated in FIG. 1, the telephone instrument 10 may be physically and acoustically interrelated with the audio mixing means 25 so that the cam member 53, microswitch 57 and sound source 68 may be dispensed with. Thus, the ringing of the bell 19 of the telephone instrument 10 may be acoustically coupled into the audio mixing means 25 for direct transmission by the voice actuated transceiver 30 to the remote transceiver 31. In any event, it will be understood that the working surfaces of the cam members 51 and 52 and the speed of rotation of the shaft 54 by the motor 50 may be selected so that a given number of discrete rings of the bell 19 of the telephone instrument 10 must occur before the cam member 51 will have been rotated far enough to fully release the button 18.

The release of the button 18 will, of course, connect the handpiece 13 of the telephone instrument 10 to the telephone network through the cords 15 and 14 in the normal manner. Referring to FIG. 3B, it will be seen that the transducer 21, according to this embodiment of the invention, consists of a block 70 of acoustically inert material having a pair of cup-like cavities 72, 73 formed therein which are dimensioned and spaced from each other to receive the mouthpiece 16 and earpiece 17, respectively, of the handpiece 13 with a snug fit. An appropriate speaker 76 is mounted in the cavity 72 so that sounds produced by the speaker 76 will be acoustically coupled through the cavity 72 to the mouthpiece 16 of the telephone handpiece 13. Similarly, an appropriate audio signal sensor 77 is associated with the cavity 73 in order to sense audio signals at the earpiece 17 of the telephone handpiece 13. The sensor means 77 is preferably an induction coil positioned for inductive coupling to the earpiece 17 of the telephone handpiece 13, as indicated in FIG. 3B, but may also be an appropriate microphone acoustically coupled to the earpiece 17 through the cavity 73. It will be understood that one function of the acoustically inert block 70 of the transducer 21 is to acoustically isolate the mouthpiece 16 and the earpiece 17 of the telephone handpiece from each other in order to avoid undesirable oscillations produced by feedback defects.

As shown in FIG. 3B, the output of the sensor means 77 is connected to an operational amplifier 78 powered by the 8.2 volt DC output of the voltage regulator 44. Although the operational amplifier 78 is shown in FIG. 3B as being mounted within the block 70 electrically connected to the audio mixing means through a plug and jack arrangement 79, it will be understood that the operational amplifier 78 may be physically located elsewhere in the apparatus and electrically connected into the apparatus by other appropriate wiring.

In any event, the output of the operational amplifier 78 is electrically connected to the audio mixing means 25. According to this embodiment of the invention, the audio mixing means 25 comprises a hollow box or chamber 80 shown in cross-section in FIG. 3B. A speaker 81, physically located within the chamber 80, is electrically connected to the output of the amplifier 78 to acoustically reproduce within the chamber 80 any audio signal present at the earpiece 17 of the telephone handpiece 13. As shown in FIG. 3B the microphone 82 of the voice operated transceiver 30 is also physically located within the chamber 80 and will thus pick up the acoustic signal produced by the speaker 81 for transmission by the transceiver 30 to the remote transceiver 31 over the radio link 32. It will be understood that commercially available transceivers 30 suitable for use with the apparatus of this invention are conventionally provided with input 83 and output 84 plug and jack arrangements thus enabling the speaker 76 of the transducer 21 as well as the microphone 82 to be conveniently connected to the electronic circuitry of the transceiver 30. It will also be understood that the transceiver 30 must be of the commercially available voice operated type including appropriate internal circuitry indicated by dotted lines 85 whereby the transceiver 30 is normally maintained in its "Receive" mode but is actuated to its "Transmit" mode by the appearance of an audio signal at the input 83 thereof in order to enable the apparatus to operate unattended.

It will be understood from the discussion thus far that the apparatus of this invention provides an interface between a conventional telephone instrument and a radio link provided by conventional commercially available transceivers without requiring direct electrical connection to the telephone instrument or modification of the electronic circuitry of the transceivers. Furthermore, it is a basic object of this invention to provide an interface apparatus that can be used with the greatest number of telephone instruments and with the greatest number of different transceivers without modification. It is estimated that substantially more than 50% of the telephone instruments in use today are of the type shown in FIG. 1 and have physical configurations and dimensions that are sufficiently standard to enable them to be accommodated by a single design of the apparatus of this invention. There are, of course, a large number of manufacturers of various transceiver designs and in view of the fact that each transceiver tends to be slightly different in its input characteristics, the acoustic type of audio mixing means 25 as shown in FIG. 3B, is preferred over an electrical/electronic type of audio mixing means which would obviously be possible. This is due to the fact that the acoustic type audio mixing means enables the use of the remote microphone 82 supplied with the transceiver 30 for coupling the interface of this invention to the transceiver. It is, of course, much easier to provide a speaker 76 which will match the output characteristics of a large number of different transceiver designs.

However, it has been found that a serious obstacle to the accomplishment of the objectives of this invention is presented by the fact that the mouthpiece 16 and earpiece 17 of conventional telephone instruments 10 are wired in parallel with each other. This is done so that the person using the handpiece 13 of a conventional telephone will hear his own voice in the earpiece 17 when he speaks into the mouthpiece 16. Although this arrangement is highly desirable in terms of comfort and confidence in using the telephone, it presents a serious problem in the operation of the interface according to the teaching of this invention since the reproduction of an acoustic signal applied to the mouthpiece 16 by the earpiece 17 will tend to actuate the transceiver 30 into its transmitting mode thereby interrupting the receiving mode of the transceiver 30. The result will be a clipping of the words and syllables spoken by the user of the remote transceiver which clipping will be unpleasant, if not actually detrimental, to the sense of the message involved. This problem has not been met in prior art attempts to provide an interface of the type disclosed herein between a telephone instrument and a radio link.

According to this invention, this problem is met by providing a voice loop 26 adapted to interrupt the audio coupling to the earpiece 17 whenever an audio signal is applied to the mouthpiece 16 of the handpiece 13. Thus, as shown in FIG. 3B, a means for sensing the application of an audio signal to the mouthpiece 16 of the handpiece 13 is shown in the form of a microphone 86 physically located in the cavity 72 with the speaker 76 and mouthpiece 16. The output of the microphone 86 is connected to the input of an operational amplifier 87 powered by the 8.2 volt DC output of the voltage regulator 44. The output of the operational amplifier is connected to the solenoid of a relay 88 having normally closed contacts 89. Such normally closed contacts 89 may be electrically imposed at any point between the output 79 of operational amplifier 78 and the input 83 of the transceiver 30. However, as shown in FIG. 3B, it is preferred that the voice loop 26 include a further relay 90 having its solenoid connected in series with the contacts 89 across the output of a further operational amplifier 93 powered by the 8.2 volt DC output of the voltage regulator 44. The input to the operational amplifier 93 may be provided by a further microphone 92 included within the chamber of the audio mixing means 25. The relay 90 includes normally open contacts 91 interposed between the microphone 82 and the input 83 of the transceiver 30. This arrangement will insure that the normally closed contacts 89 of the relay 88 will have time to open upon application of an audio signal to the mouthpiece 16 before the contacts 91 of the relay 90 can close to apply the reproduction of such audio signal at the earpiece 17 to the input of the transceiver 30 through an appropriate filter network consisting of resistors 93 and capacitor 94. It also enables the magnitude of the audio signal present at the earpiece to be sensed by selecting an appropriate combination of the gain of amplifier 93 and solenoid 92 to allow contacts 91 to open whenever the magnitude of such audio signal falls below given level.

It would, of course, be possible to connect the amplifier 87 in parallel with the speaker 76 and thus avoid the need for the microphone 86. However, such an arrangement might introduce matching problems to the output of the transceiver 30 and in the interest of making the interface apparatus of this invention as flexible as possible in terms of its usability with the various commercially available transceivers, the acoustic link described is preferred.

When a particular telephone conversation has been completed, it then becomes necessary to simulate the return of the handpiece 13 to the cradle 12 of the telephone instrument. In the prior art various methods have been proposed. For example, a simple timing device might be used to actuate the device 22 to simulate the return of the handpiece 13 to the cradle 12. However, this would detract radically from the flexibility of the apparatus since it would impose an arbitrary time limit upon the length of any particular conversation or would leave the telephone instrument connected to the telephone network longer than necessary.

It has also been proposed to provide an oscillator means at the remote transceiver for the purpose of sending a particular signal at the conclusion of a conversation to actuate special means in the interface apparatus to cause it to simulate the return of the handpiece to the cradle. Finally, it has been proposed to include appropriate circuitry in the interface apparatus for simulating the return of the handpiece to the cradle if no audio signal is present in the system for a preselected period of time. In the first instance, some apparatus in addition to the transceiver 31 would be necessary at the remote end of the radio link 32 and in the other instance, the apparatus would be sensitive to interference or unavoidable delays during the course of a telephone conversation or fading of the radio signal, which sensitivity would tend to result in the undesired interruption of telephone conversations.

According to the teaching of this invention, use is made of the fact that, when the calling party has returned his handpiece to the cradle disconnecting his telephone instrument from the telephone network, the dial tone originating in the telephone network will be applied to the telephone instrument which has been called. Thus, assuming that a telephone call using the apparatus of this invention has been concluded, the caller will hang up and the telephone network dial tone will appear at the earpiece 17. Such dial tone is of constant amplitude and frequency and will, of course, be sensed by the inductive coil 77 amplified by the amplifier 78 and applied to the speaker 81. According to the teaching of this invention, the telephone reset means 24 is connected to the output 79 of the amplifier 78 in parallel with the speaker 81.

As shown in FIG. 3B, the telephone reset means 24 includes a transformer 100 having its primary winding connected in parallel with the winding of the speaker 81. The function of the transformer 100 is to increase the voltage of the output of the amplifier 78 to a level high enough for rectification into direct current. Thus, the secondary winding of the transformer 100 is connected to a full-wave rectifier 101 comprising four diodes connected in the usual full-wave bridge rectifier array. The DC output of the rectifier 101 is connected to the input of a DC amplifier 102 powered by the 8.2 volt DC output of the voltage regulator 44 through a potentiometer arrangement 103. The output of the amplifier 102 is connected across the solenoid of a relay 104.

The relay 104 includes first normally open contacts 105 and second normally closed contacts 106. The normally open contacts 105 of the relay 104 are connected in series with a variable resistor 107 and the capacitor 108 across the 12 volt DC output of the voltage regulator 43. A transistor 109 and a resistor 110 electrically connected in series with each other are connected in parallel with the series connected variable resistor 107 and capacitor 108. The junction between the variable resistor 107 and the capacitor 108 is connected to the base of the transistor 109 and also to ground through the normally closed contacts 106 of the relay 104. Finally, the solenoid of a further relay 111 is connected in series with a silicon controlled rectifier 112 across the 12 volt DC output of the voltage regulator 43 in parallel with the above described array of contacts 105, variable resistor 107, capacitor 108, transistor 109 and resistor 110. The junction between the transistor 109 and the resistor 110 is connected to the trigger electrode of the silicon controlled rectifier 112 and the normally open contacts 113 of the relay 111 are connected in parallel with the normally open contacts 67 of the relay 66 and the microswitch 57.

Thus, it will be seen that in the normal condition of the telephone reset means as shown in FIG. 3B, the capacitor 108 will be discharged to ground and no voltage will be present on the base of the transistor 109 thereby biasing it to its non-conducting condition. Since no current can flow through the transistor 109, no voltage is applied to the trigger electrode of the silicon controlled rectifier 112 and it cannot conduct. Therefore, the solenoid 111 will not be actuated and the contacts thereof will be in their normally open condition.

The occurrence of an audio signal at the earpiece 17 of the handpiece 13 will be coupled both to the speaker 81 and to the primary winding of the transformer 100. The voltage of such signal will be increased in the secondary winding of the transformer 100 converted to DC by the rectifier 101 and applied to the input of the amplifier 102. The output of the amplifier 102 will tend to actuate the relay 104 but the setting of the potentiometer 103 may be adjusted so that the output of the amplifier 102 will only be sufficient to actuate the relay 104 in response to the higher amplitudes of the audio signal in normal conversation. In this regard it is noted that the dial tone generated by the telephone network and applied to the earpiece 17 when the calling party has returned his handpiece to its cradle has an amplitude equal to or greater than the highest amplitudes encountered in normal telephone conversation. Thus the potentiometer 103 may be set so that the relay 104 is only actuated occasionally, if at all, during normal telephone conversation but will be immediately actuated upon application of the dial tone to the earpiece 17.

Whenever the relay 104 is actuated, the normally open contacts 105 thereof will close, applying the 12 volt DC output of the voltage regulator 43 across the parallel array consisting of series connected variable resistor 107 and capacitor 108 in parallel with series connected transistor 109 and resistor 110. Simultaneously, the normally closed contacts 106 of relay 104 will open, allowing a charge to be established on the capacitor 108. When the charge on the capacitor 108 reaches a sufficiently high level to bias the transistor 109 to its conducting condition, a voltage will be established across the resistor 110 which will be applied to the trigger electrode of the silicon controlled rectifier 112. The firing of the silicon controlled rectifier 112 will actuate the relay 111 closing the normally open contacts 113 thereof thereby energizing the motor 50 of the device 22 to rotate the cam members 51, 52 and 53 back to their normal position at which point the button 18 of the telephone instrument will be depressed disconnecting the handpiece 13 and removing the input to the telephone reset means 24 to allow it to return to its normal inoperative condition.

It will be understood that the charging of the capacitor 108 is the key to the operation of the telephone reset means 24. Thus, the variable resistor 107 may be set to require that the relay 104 be continuously actuated for a substantial length of time (e.g. 15 seconds) before the charge on the capacitor 108 will be high enough to bias the transistor 109 to its conducting condition. In addition, the setting of the potentiomer 103 will not only insure that any interference on the telephone line in the form of continuous signals but of much lower amplitude than the dial tone will not actuate the telephone reset means 24 but will also minimize the periodic operation or "chattering" of the relay 104 during normal conversation which may include intermittent amplitudes high enough to actuate the relay 104.

Referring again to FIG. 3A, an indicator light 120 may be connected in parallel with the motor 50 in order to give a visual indication that the device 22 is operating to either answer a call to the telephone instrument or reset the telephone instrument for further calls. Similarly a manually operable switch 122 may be connected in series with normally open contacts 67 of the relay 66 and the normally open contacts 113 of the relay 111 to enable the functioning of the apparatus to be tested. Thus the manual operation of the switch 122 will initiate the operation of the telephone answering means at which point the dial tone will appear at the earpiece 17 to initiate the operation of the telephone reset means. During such cycle of operation the indicator light will come on after the button 122 has been held down for the selected period of time corresponding to the number of rings for which the apparatus is set and will remain on until the answering portion of the cycle is completed. At that point the indicator light will go out and remain out for the preselected period of time established by the setting of the variable resistor 107 before the telephone reset means is actuated by the dial tone. The lamp 120 will then again come on and remain on until the device 22 has again returned to its normal condition with the button 18 depressed to reset the telephone instrument for receipt of a call.

It is believed that those skilled in the art will make various modifications in the specific circuitry and apparatus disclosed in the drawing, some of which have been mentioned hereinabove without departing from the teaching of this invention. It would, of course, be possible to substitute timing circuits and solenoids for the device 22 in operating telephone instruments of different design from that shown in the drawing. However, it is believed that the device 22 provides a more rugged, inexpensive and efficient timing device than has been heretofore proposed in the prior art for use in connection with conventional telephone instruments. It is again pointed out that in spite of the simplicity and flexibility of the interface means according to the teaching of this invention, the method and means of this invention provides improved operation and greater reliability than similar apparatus heretofore proposed. As shown in FIG. 1, apparatus constructed in accordance with the teaching of this invention is compact and may be attractively fabricated at a low cost. The assembly and disassembly of the device with a telephone instrument may be quickly accomplished to allow normal use of the telephone instrument. Similarly, the transceiver may be quickly and easily assembled and disassembled from the apparatus of this invention in order to enable it to be used in its normal manner and the user of apparatus according to the teaching of this invention may select from a wide variety of commercially available transceivers to suit his own particular circumstances and specific needs.

What is claimed is:

1. In apparatus for interfacing between a telephone instrument of a conventional telephone network and a conventional wireless communication system including at least one voice actuated transceiver having an audio signal input means and an audio signal output means, which apparatus includes
   a. electromechanical control means removably mounted on said telephone instrument for simulating the removal and return of the handset of said telephone instrument from and to the cradle thereof, respectively;
   b. audio transducer means receiving the mouthpiece and earpiece of said handset of said telephone instrument, said audio transducer means being adapted to acoustically insulate said mouthpiece and said earpiece from each other and including speaker means for applying acoustic signals to said mouthpiece as well as means for detecting and amplifying audio signals present at said earpiece and audio signal sensor means for sensing the application of said acoustic signal to said mouthpiece;
   c. electrical means for transmitting the amplified audio signals detected at said earpiece from said transducer means to said audio signal input means of said transceiver;
   d. voice loop means for interrupting said means transmitting audio signals from said earpiece to said audio signal input of said transceiver when said audio signal sensor means senses the application of said acoustic signals to said mouthpiece; and
   e. answering means for sensing the ringing of said telephone instrument by said telephone network and actuating said control means to simulate the removal of said handset of said telephone instrument from the cradle thereof;
   the improvement comprising audio mixing means in addition to said audio transducer means and interposed in said means for transmitting said amplified audio signals detected at said earpiece from said transducer to said audio signal input means of said transceiver, said audio mixing means including a hollow acoustic chamber and a speaker within said chamber for acoustically reproducing said amplified audio signal whereby a conventional microphone coupled to said audio signal input means of said transceiver may be located within said chamber for acoustic coupling to said speaker within said chamber.

2. Apparatus as claimed in claim 1 including reset means for sensing the application of the dial tone of said telephone network to said telephone instrument and actuating said control means to simulate the return of said handset of said telephone instrument to the cradle thereof.

3. Apparatus as claimed in claim 1 including means for sensing the magnitude of audio signals present at said earpiece and actuating said voice loop means for interrupting said means transmitting said audio signals from said earpiece to said audio input means of said transceiver when said magnitude of audio signals present at said earpiece is less than a given magnitude.

4. Apparatus as claimed in claim 1 wherein said telephone instrument is of the conventional type having an actuation button associated with the cradle thereof and said electromechanical control means comprises an electrical motor geared to a shaft carrying a cam member having an active surface designed to alternately depress and release said actuation button upon rotation of said shaft by said electrical motor.

5. Apparatus as claimed in claim 1 including means producing an acoustic signal in said chamber in response to said ringing of said telephone instrument.

6. Apparatus for interfacing between a telephone instrument of a conventional telephone network and a conventional wireless communication system including at least one voice actuated transceiver having an audio signal input means and an audio signal output means, said apparatus including
   a. electromechanical control means removably mounted on said telephone instrument for simulating the removal and return of the handset of said telephone instrument from and to the cradle thereof, respectively;
   b. audio transducer means receiving the mouthpiece and earpiece of said handset of said telephone instrument, said audio transducer means being adapted to acoustically insulate said mouthpiece and said earpiece from each other and including speaker means for applying acoustic signals to said mouthpiece, means for detecting the presence of audio signals at said earpiece, and audio signal sensor means for sensing the application of said acoustic signal to said mouthpiece;

c. means for transmitting audio signals detected at said earpiece from said transducer means to said audio signal input means of said transceiver comprising audio mixing means including a hollow acoustic chamber, a speaker within said chamber for acoustically reproducing said audio signal and a microphone within said chamber coupled to said audio signal input means of said transceiver;

d. voice loop means for interrupting said means transmitting audio signals from said earpiece to said audio signal input of said transceiver when said audio signal sensor means senses the application of said acoustic signals to said mouthpiece;

e. answering means for sensing the ringing of said telephone instrument by said telephone network and actuating said control means to simulate the removal of said handset of said telephone instrument from the cradle thereof; and f. reset means for sensing the application of the dial tone of said telephone network to said telephone instrument and actuating said control means to simulate the return of said handset of said telephone instrument to the cradle thereof;

said reset means comprising a voltage step-up transformer having its primary winding connected to said means for detecting the presence of audio signals at said earpiece; rectifier means connected to the output of said transformer, variable gain amplifier means connected to the output of said rectifier, a double pole single throw relay having its solenoid connected across the output of said amplifier, one pole of said first relay comprising normally open contacts connected in series with a variable resistor and a capacitor across a DC power source and the other pole of said relay comprising normally closed contacts connected between the junction of said variable resistor and said capacitor and one terminal of said power source, a transistor connected in series with a resistor across said variable resistor and said capacitor; a single pole single throw second relay connected in series with a silicone controlled rectifier across a DC power source, the junction between said variable resistor and said capacitor being connected to the base of said transistor, the junction between said transistor and said resistor being connected to the trigger electrode of said silicone controlled rectifier, and said normally open contacts of said second relay being electrically connected to actuate said control means to simulate the return of said handset of said telephone instrument to the cradle thereof upon closure of said normally open contacts.

7. Apparatus for interfacing between a telephone instrument of a conventional telephone network and a conventional wireless communication system including at least one voice actuated transceiver having an audio signal input means and an audio signal output means, said apparatus including a. electromechanical control means removably mounted on said telephone instrument for simulating the removal and return of the handset of said telephone instrument from and to the cradle thereof, respectively;

b. audio transducer means receiving the mouthpiece and earpiece of said handset of said telephone instrument, said audio transducer means being adapted to acoustically insulate said mouthpiece and said earpiece from each other and including speaker means for applying acoustic signals to said mouthpiece, means for detecting the presence of audio signals at said earpiece and audio signal sensor means for sensing the application of said acoustic signal to said mouthpiece comprising a microphone mounted in said transducer means;

c. means for transmitting audio signals detected at said earpiece from said transducer means to said audio signal input means of said transceiver comprising audio mixing means including a hollow acoustic chamber, a speaker within said chamber for acoustically reproducing said audio signal and a microphone within said chamber coupled to said audio signal input means of said transceiver;

d. voice loop means for interrupting said means transmitting audio signals from said earpiece to said audio signal input of said transceiver when said audio signal sensor means senses the application of said acoustic signal to said mouthpiece;

e. means comprising a further microphone within said hollow acoustic chamber for sensing the magnitude of audio signals present at said earpiece and actuating said voice loop means for interrupting said means transmitting said audio signals from said earpiece to said audio input means of said transceiver when said magnitude of audio signals present at said earpiece is less than a given magnitude; and f. answering means for sensing the ringing of said telephone instrument by said telephone network and actuating said control means to simulate the removal of said handset of said telephone instrument from the cradle thereof;

said voice loop means including a first operational amplifier having its input connected to the output of said further microphone in said chamber and a second operational amplifier having its input connected to the output of said microphone in said transducer, a first single pole single throw relay having normally open contacts and a second single pole single throw relay having normally closed contacts, the solenoid of said first relay and the normally closed contacts of said second relay being connected in series across the output of said first operational amplifier, the solenoid of said second relay being connected across the output of said second operational amplifier, and said normally open contacts of said first relay being interposed in said audio signal input means of said transceiver.

8. Apparatus as claimed in claim 7 including means producing an acoustic signal in said chamber in response to said ringing of said telephone instrument.

* * * * *